(12) United States Patent
Dima et al.

(10) Patent No.: US 11,703,880 B2
(45) Date of Patent: Jul. 18, 2023

(54) SENSOR ARRANGEMENT FOR AN AGRICULTURAL VEHICLE

(71) Applicant: DEERE & COMPANY, Moline, IL (US)

(72) Inventors: Cristian Dima, Mannheim (DE); Dohn W. Pfeiffer, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 593 days.

(21) Appl. No.: 16/866,652

(22) Filed: May 5, 2020

(65) Prior Publication Data

US 2020/0379479 A1    Dec. 3, 2020

(30) Foreign Application Priority Data

May 31, 2019    (DE) .......................... 102019207982.2

(51) Int. Cl.
*G05D 1/02*    (2020.01)
*A01D 41/127*    (2006.01)

(52) U.S. Cl.
CPC ....... *G05D 1/0251* (2013.01); *A01D 41/1274* (2013.01); *A01D 41/1278* (2013.01); *G05D 1/0223* (2013.01); *G05D 2201/0201* (2013.01)

(58) Field of Classification Search
CPC .............. G05D 1/0251; G05D 1/0223; G05D 2201/0201; A01D 41/1274; A01D 41/1278; A01B 79/005; A01B 69/001
See application file for complete search history.

(56) References Cited

U.S. PATENT DOCUMENTS

| 7,350,343 | B2 | 4/2008 | Beck |
| 8,520,483 | B2 | 8/2013 | Li et al. |
| 2011/0242287 | A1* | 10/2011 | Cieslinski .............. G02B 30/24 396/323 |
| 2012/0265416 | A1* | 10/2012 | Lu .......................... G08G 1/168 348/148 |
| 2018/0165833 | A1* | 6/2018 | Inoue ................... H04N 17/002 |
| 2019/0150357 | A1* | 5/2019 | Wu ......................... H04N 7/188 |
| 2020/0112657 | A1* | 4/2020 | Stein ...................... G01C 11/02 |
| 2021/0329906 | A1* | 10/2021 | Taarnhøj .............. G06V 10/143 |
| 2022/0360693 | A1* | 11/2022 | Stein ...................... H04N 7/181 |

FOREIGN PATENT DOCUMENTS

EP    2545761 B1    12/2016

* cited by examiner

*Primary Examiner* — Russell Frejd
(74) *Attorney, Agent, or Firm* — Taft Stettinius & Hollister LLP; Stephen F. Rost

(57) ABSTRACT

A sensor arrangement for an agricultural vehicle includes a first electro-optical sensor including a first field of view having an optical axis, and a second electro-optical sensor including a second field of view having an optical axis. The first and second sensors are spaced apart from one another and oriented such that the optical axes of the two sensors intersect at a distance from the two sensors.

20 Claims, 2 Drawing Sheets

SENSOR ARRANGEMENT FOR AN AGRICULTURAL VEHICLE

RELATED APPLICATIONS

This application claims priority to German Patent Application Ser. No. 102019207982.2, filed May 31, 2019, the disclosure of which is hereby incorporated by reference in its entirety.

FIELD OF THE DISCLOSURE

The present disclosure relates to a sensor arrangement for an agricultural vehicle, and in particular to a sensor arrangement having a first electro-optical sensor which includes a first field of view having an optical axis and a second electro-optical sensor which includes a second field of view having an optical axis, and also a vehicle that is fitted with the sensor arrangement.

BACKGROUND

Functions in agriculture are becoming increasingly automated. Electro-optical sensors that may be embodied as a camera or laser scanner are often used in order to sensorially inspect specific characteristics of a surface that is to be cultivated prior to or after processing and in order to control an actuator that controls the processing or steering in dependence upon the result of the sensory inspection. Since relatively large working widths are to be monitored, for example, the width of the entire cutting system in the case of a cutting system of a combine harvester, a single camera having a wide-angle lens is used (cf., EP 1 266 554 A2 or EP 2 143 316 A1) or multiple cameras are distributed adjacent to one another over the working width that is to be monitored, the fields of view of the cameras likewise being adjacent to one another (for example, EP 2 545 761 A1).

When wide-angle lenses are used (typically embodied as fisheye lenses having 180° or larger image angle or wide-angle lenses having an image angle of approximately 70 to 90°) or when large scanning angle ranges of laser scanners are used, the effective resolution of the sensor is spread over a larger region of the field, which results in a resolution of the signals which is not sufficient in all cases. In the case of a sensor having a camera, by way of example the dimensions of the projection of a pixel on the ground may be taken into account, the dimensions increasing with the image angle of the lens in the case of a provided distance between the camera and ground. The result is that the capability of a wide-angle camera of this type to detect further surfaces at a distance with a resolution that is sufficient for the texture analysis of the material that is located on the ground is particularly limited. This disadvantageously influences the performance of systems, which use texture information so as to classify the material, or stereo systems.

Conversely, if a camera having a smaller viewing angle is used, the viewing field is also limited. If larger working widths are to be covered, the parts of the image that are to be inspected are at a greater distance from the camera, which has a disadvantageous effect, for example, when line of sight is impaired as a result of dust or similar. Moreover, the viewing angle with which the field or the crop stock is viewed is relatively flat with the result that the surface of the field is viewed from an approximately parallel position and a stereo analysis or texture analysis is only possible to a limited extent. However, it is possible to monitor the function of a wide cutting system using only a wide-angle lens.

In the case of the configurations having cameras that are arranged adjacent to one another, the viewing angles are oriented from the vehicle onto the region of the field that is to be observed, in other words in general directly forward or downward. The sensor is accordingly arranged relatively near to the surface that is to be sensed with the result that this surface is relatively small. In this case, either gaps appear between adjacent fields of view or dead angles appear in particular near to the vehicle.

Thus, there is a need to improve an electro-optical sensor system for an agricultural vehicle to such an extent that the mentioned disadvantages are avoided or are at least present to a reduced extent.

SUMMARY

According to the disclosure, a sensor arrangement for an agricultural vehicle comprises a first electro-optical sensor, which comprises a first field of view having an optical axis, and a second electro-optical sensor, which comprises a second field of view having an optical axis. The two sensors are positioned spaced apart from one another and are oriented in such a manner that the optical axes of the two sensors intersect at a distance from the two sensors.

In other words, the first sensor is oriented to a greater extent in the direction of the second sensor than the second sensor, and the second sensor is oriented to a greater extent in the direction of the first sensor than the first sensor, which leads to the fact that the optical axes of the two sensors intersect. A type of cross-eyed arrangement is consequently achieved that renders it possible to arrange the sensors at a greater distance from the surface that is to be observed than if each sensor was directly oriented onto the surface that is adjacent to the sensor. In the case of a provided geometry of the vehicle to which the sensors are to be attached, the sensors are consequently moved further away from the surface that is to be observed in order to obtain a better overview similar to how a photographer moves backward from a group that is to be photographed if the people do not all fit into the image. As a consequence, a better overview is obtained over the region that is to be sensed than in the case of previous sensor arrangements.

The electro-optical sensors may be respectively embodied as cameras that are connected to an image processing system. The cameras may be embodied as monocular or stereo cameras or as time-of-flight (PMD) cameras. It is also possible to use optical rangefinders (LIDAR or laser rangefinders) that operate in the visible or in another arbitrary electro-magnetic wavelength range including radio waves and respectively scan a field of view in a one-dimensional or two-dimensional manner and measure the distance to the reflection point with reference to the time-of-flight.

The sensor arrangement may be attached to a vehicle and may be connected to a control device that is configured so as to control at least one actuator or a display device based on the signal of the sensors. In the first case, the sensor arrangement may ascertain a specific characteristic of a field that is to be processed and the control device may control the actuator in dependence upon the characteristic. For example, it may control the speed of a harvesting machine in dependence upon the stock density ahead of the harvesting machine, may steer the harvesting machine along a crop edge or a swath or to guide a hoe along a row, or to ascertain a specific characteristic of the field that is to be processed and to control the actuator in dependence upon the characteristic such as when the ground is being processed may control the speed in dependence upon the smoothness of the ground prior to or after the processing or may optimize the distribution of straw in the sense of an even distribution over the cutting width. In the second case, the operator of the vehicle may supply possible inputs that are required into an operator interface with the aid of the image that is displayed in order to control an actuator accordingly.

The first sensor may be fastened to a first side of an attachment platform of the vehicle, the second sensor may be fastened to a second side of the attachment platform, while the first field of view is oriented toward the second side and the second field of view is oriented toward the first side.

The attachment platform may be the roof of a cabin of the vehicle or a chassis of the vehicle.

The sensors may be oriented forward (for example, toward the stock of the crop ahead of the vehicle or a field that is to be processed using a ground processing device) or to the rear (for example, toward the field that is processed using a ground processing device or that is influenced with straw using a straw chopper). Alternatively, the sensors may be oriented to the side (for example, toward the buildup of stubble that is left behind by a cutting system or the stock adjacent to an aisle that has just been harvested) or the sensors may be arranged so as to ascertain the area surrounding the vehicle (including possible obstacles, transport vehicles, living creatures). The sensors may be a part of the vehicle (for example, a harvesting attachment, in particular in the form of a cutting system or maize picker and the crop that is moving therein or a ground processing device), in particular in order to monitor the function of the part that is observed (including a mounting device) of the vehicle or to sense a characteristic of the field prior to or after processing and to control an actuator based on the characteristic.

The vehicle may be embodied in the form of a combine harvester, wherein the sensor arrangement is oriented toward the field ahead of a cutting system or the cutting system or toward the field to the rear of the combine harvester. The vehicle may also be another type of harvesting machine, for example, a field chopper, a baler or a cotton picker or another arbitrary agricultural vehicle for fertilizing, spraying, cutting or ground processing. The vehicle, with the aid of the signals of the sensor arrangement, may be steered automatically along a driving lane or the output of the vehicle being controlled automatically with the aid of the signals of the sensor arrangement in dependence upon the crop state that is sensed.

The actuator may be accordingly configured so as to steer or so as to adjust an operating parameter of the vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
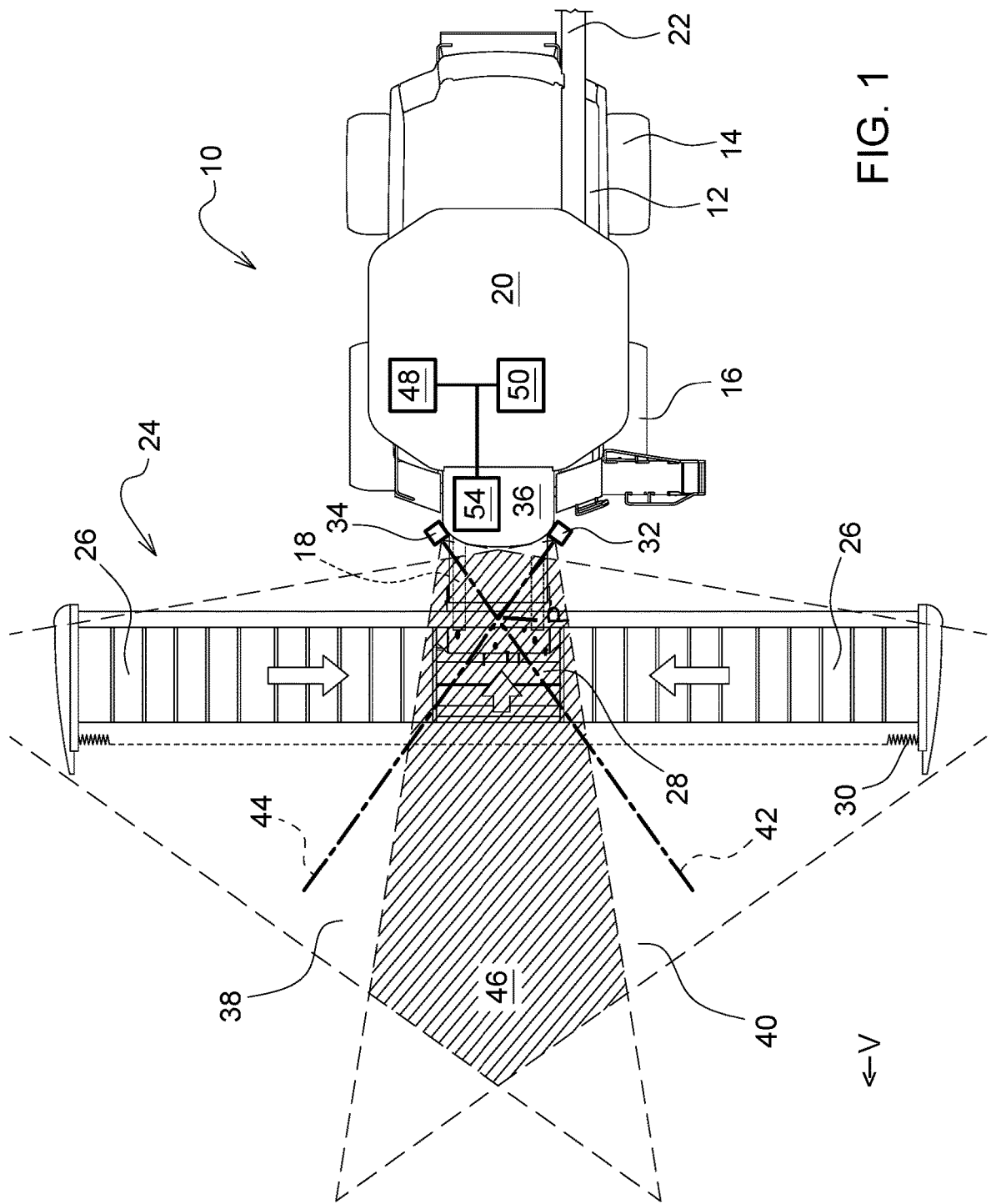
FIG. 1 illustrates a plan view of a combine harvester according to a first embodiment.

FIG. 1 illustrates an agricultural harvesting machine 10 in the form of a combine harvester having a supporting structure 12 that is provided with rear steerable wheels 14, which are in engagement with the ground, and front wheels 16 that are driven and that move the harvesting machine 10 during operation in a forward direction V over a field that is to be harvested. Although the combine harvester 10 is illustrated with wheels 14, 16, the combine harvester could also be provided with two or four track rollers. A harvesting attachment 24 is used so as to harvest crop and leads to a feeder house 18 that conveys the crop into the interior of the harvesting machine 10 where the crop is threshed, separated and cleaned in a known manner. The cleaned corn is finally deposited in a corn tank 20 from which it is possible via an unloading conveyer 22 to be loaded onto a transporting vehicle. The teachings of the present disclosure may also be used on a field chopper in lieu of on a combine harvester 10.

The harvesting attachment 24 is embodied as a cutting system having cross conveyor belts 26 and a central conveyor belt 28 that conveys to the rear and a cutting device 30 is located on the front side of the conveyor belt.

A sensor arrangement is attached to the front corners of the roof 36 of a cabin of the harvesting machine 10, the sensor arrangement including a first electro-optical sensor 32 and a second electro-optical sensor 34. The first and second electro-optical sensors may be respectively monocular or stereo cameras. The first sensor 32 has a (conical or pyramid-shaped) field of view 38 having an optical axis 42. The second sensor 34 has a (conical or pyramid-shaped) field of view 40 having an optical axis 44.

The first sensor 32 is attached to the front left-hand side corner of the roof 36 in the forward direction V and the optical axis 42 of the first sensor is inclined obliquely downward and forward, however, the first sensor is oriented obliquely toward the right-hand side with respect to the forward direction V. The second sensor 34 is attached to the front right-hand side corner of the roof 36 in the forward direction V and the optical axis 44 of the second sensor is inclined obliquely downward and forward, however, the second sensor is oriented obliquely toward the left-hand side with respect to the forward direction V. The optical axes 42, 44 are symmetrically identical with respect to the vertical longitudinal center plane of the harvesting machine 10 and are respectively inclined downward to the same extent. The optical axes 42, 44 consequently intersect at a point P that lies ahead of the sensors 32, 34.

The sensors 32, 34 are accordingly arranged spaced further from the regions that are to be inspected, which may be the crop stock ahead of the harvesting attachment 24 or the harvesting attachment 24, than if the optical axes 42, 44 of the sensors would be oriented precisely forward or the axis 42 of the first sensor 32 would be oriented toward the left-hand side and the axis of the second sensor 34 would be oriented toward the right-hand side. It is possible by the greater distances for the sensors 32, 34 (in the case of provided dimensions of the regions that are to be observed) to use lenses having smaller viewing angles than beforehand which suffer from fewer imaging defects than wide-angle lenses and are available at a more affordable price. Moreover, in the center ahead of the harvesting attachment an overlapping region 46 is provided that renders possible more robust measurements than when observing using only a single sensor 32 or 34, and there is a simplified possibility of positioning the sensors with respect to one another in that the images of the sensors are compared.

The sensors 32, 34 are connected to a control device 48 so as to transmit signals. The control device is connected on the control device side to a display device 54 and one or multiple actuator(s) 50. The image signals of the image sensors of the sensors 32, 34 are processed by image processing systems of the sensors 32, 34 or the control device 48 or image processing systems that are connected between the sensors and the control device. The control device 48 controls the display device 54 so as to display suitable images in which the operator on the one hand may see the stock ahead of the harvesting attachment 24 and on the other hand may also see the harvesting attachment 24 and may monitor the function of the harvesting attachment, wherein where applicable problems that are identified such as the crop winding around the reel or cross conveyor problems may be highlighted optically. In addition or alternatively, the actuator 50 is controlled in dependence upon the signal of the sensors 32, 34 in order to control the advancing speed of the harvesting machine 10 in dependence upon the stock density or to steer the harvesting attachment 24 along a crop edge. The procedure of setting operating parameters of the harvesting attachment (reel position in horizontal and vertical direction, operating height etc.) may also be controlled by the control device automatically with the aid of the signal of the sensors 32, 34.

Figure 2:
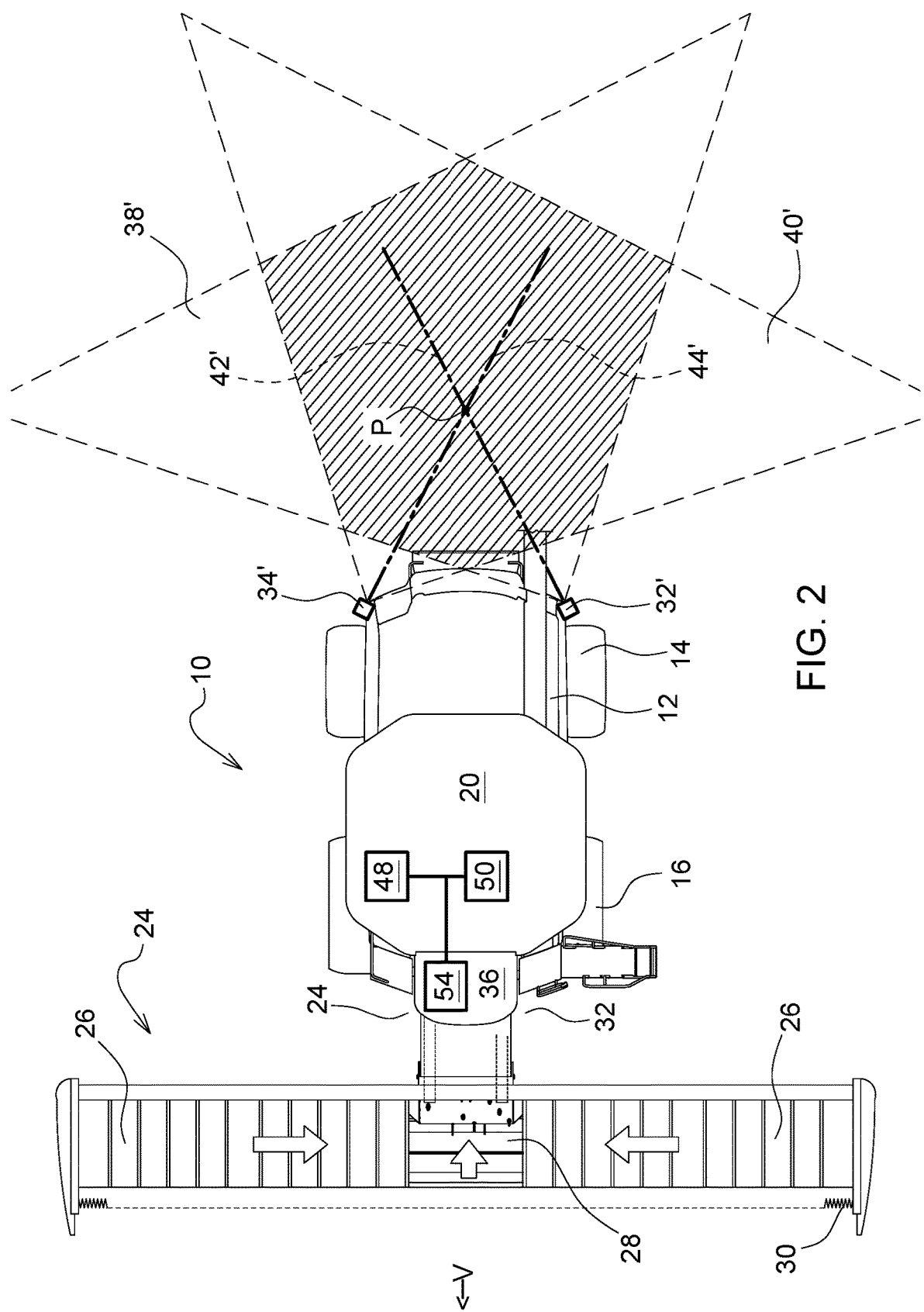
FIG. 2 illustrates a plan view of a combine harvester according to a second embodiment.

In the case of the embodiment according to FIG. 2, the sensors 32', 34' are oriented from the upper, rear edge of the chassis 12 of the harvesting machine 10 toward the rear. The first sensor 32' is attached to the rear, left-hand side corner of the chassis 12 in the forward direction V and the optical axis 42' of the first sensor is inclined obliquely downward and to the rear, however, the first sensor is oriented obliquely toward the right-hand side with respect to the forward direction V. The second sensor 34' is attached to the rear, right-hand side corner of the chassis 12 in the forward direction V and the optical axis 44' of the second sensor is inclined obliquely downward and to the rear, however, the second sensor is oriented obliquely toward the left-hand side with respect to the forward direction V. The optical axes 42' 44' are symmetrically identical with respect to the vertical longitudinal center plane of the harvesting machine 10 and are respectively inclined downward to the same extent. The optical axes 42, 44 consequently intersect at a point P that lies behind the sensors 32', 34'.

The signals of the sensors 32', 34' are evaluated and displayed in a similar manner to the description of FIG. 1. Here, the signals of the sensors 32', 34' are used for the purpose of adjusting an actuator 50 that cooperates with a distributing device of the straw chopper of the harvesting machine 10 and is used for evenly distributing the remainder of the crop over the working width of the harvesting attachment 24, which is why guiding plates or rotational speeds of straw distributors may be adjusted.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A sensor arrangement for an agricultural vehicle, comprising:
a first electro-optical sensor comprising a first field of view having an optical;
a second electro-optical sensor comprising a second field of view having an optical axis;
wherein, the first and second sensors are spaced apart from one another and oriented such that the optical axes of the two sensors are obliquely oriented in opposing directions so as to be symmetrically arranged relative to a vertical longitudinal center plane of the agricultural vehicle and downwardly inclined to the same extent such that the optical axes of the two sensors intersect at a location within both the first and second fields of view.

2. The sensor arrangement of claim 1, wherein the electro-optical sensors are respectively embodied as a camera that is connected to an image processing system.

3. The sensor arrangement of claim 1, wherein first electro-optical sensor and second electro-optical sensor are oriented in a forward travelling direction and coupled to a front portion of the vehicle.

4. The sensor arrangement of claim 1, wherein first electro-optical sensor and second electro-optical sensor are oriented in a rear direction relative to a forward travelling direction of the vehicle and coupled to a rear portion of the vehicle.

5. An agricultural vehicle for travelling in a forward direction, comprising:
a support structure;
at least one wheel for supporting the support structure;
a cab mounted to the support structure;
a harvesting attachment mounted to the support structure; and
a sensor arrangement comprising a first electro-optical sensor and a second electro-optical sensor, the first electro-optical sensor comprising a first field of view defining a first optical axis and the second electro-optical sensor comprising a second field of view defining a second optical axis;
wherein, the first and second electro-optical sensors are spaced apart from one another and oriented such that the optical axes of the sensors are obliquely oriented in opposing directions so as to be symmetrically arranged relative to a vertical longitudinal center plane of the agricultural vehicle and intersect at a location within both the first and second fields of view at a distance from the two sensors.

6. The vehicle of claim 5, further comprising a controlling device coupled to the sensors, the sensors configured to transmit signals to the controlling device.

7. The vehicle of claim 6, further comprising a display device located within the cab of the vehicle, the display device being in communication with the controlling device to display images taken by the sensors.

8. The vehicle of claim 6, further comprising an actuator disposed in communication with the controlling device.

9. The vehicle of claim 8, wherein the actuator is operably controlled based on one or more signals transmitted by the sensors for controlling a speed of the machine or steering the harvesting attachment.

10. The vehicle of claim 6, wherein the controlling device operably sets operating parameters of the harvesting attachment based on one or more signals transmitted by the sensors.

11. The vehicle of claim 5, wherein:
the first sensor is coupled to a first side of an attachment platform of the vehicle;
the second sensor is coupled to a second side of the attachment platform;
the first field of view is oriented toward the second side; and
the second field of view is oriented toward the first side.

12. The vehicle of claim 11, wherein the attachment platform comprises the roof of the cab or the supporting structure of the vehicle.

13. The vehicle of claim 5, wherein the sensors are oriented in the forward direction.

14. The vehicle of claim 5, wherein the sensors are oriented in a direction opposite the forward direction or at an angle relative to the forward direction.

15. The vehicle of claim 5, wherein the sensors are arranged so as to ascertain the area surrounding the vehicle or a part of the vehicle.

16. The vehicle of claim 5, further comprising a cutting system coupled to the harvesting attachment, wherein the sensor arrangement is oriented toward an area of a field ahead of the cutting system.

17. The vehicle of claim 5, wherein the second optical axis is obliquely oriented, relative to the forward direction, toward a first side of the cab, and the first optical axis is obliquely oriented, relative to the forward direction, toward an opposing second side of the cab, wherein both the first and second optical axes are further oriented in a vertically downward direction.

18. An agricultural vehicle travelling in a forward travel direction across a field, comprising:
a support structure;
at least one wheel for supporting the support structure;
a cab mounted to the support structure;
a harvesting attachment mounted to a front portion of the support structure;
a sensor arrangement comprising a first electro-optical sensor and a second electro-optical sensor, the first electro-optical sensor comprising a first field of view defining a first optical axis and the second electro-optical sensor comprising a second field of view defining a second optical axis; and
a controlling device coupled to the sensors;
wherein, the first and second electro-optical sensors are spaced apart from one another and oriented such that the optical axes of the sensors are obliquely oriented in opposing directions so as to be symmetrically arranged relative to a vertical longitudinal center plane of the agricultural vehicle and intersect at a distance from the two sensors in an overlapping area at which the first and second fields of view overlap;
further wherein the controlling device compares images of the overlapping area captured by the first electro-optical sensor to images of the overlapping area captured by the second electro-optical sensor; and
further wherein, the first electro-optical sensor is coupled to a rear portion of the cab and is oriented in a direction opposite the forward travelling direction, and the second electro-optical sensor is coupled to the rear portion of the cab and is oriented in the direction opposite the forward travelling direction.

19. The vehicle of claim 18, further comprising a display device located within the cab of the vehicle, the display device being in communication with the controlling device to display images taken by the sensors.

20. The vehicle of claim 18, further comprising an actuator disposed in communication with the controlling device, wherein the actuator is operably controlled based on one or more signals transmitted by the sensors for controlling a distribution of crop over a width of the harvesting attachment.

\* \* \* \* \*